Figure 1:
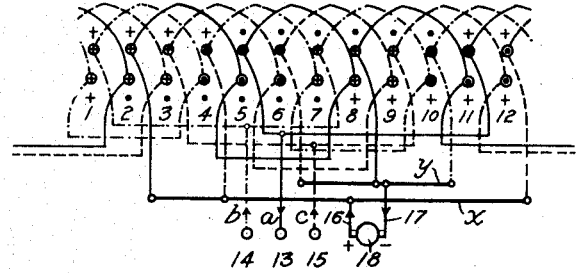

L. J. HUNT.
DYNAMO ELECTRIC MACHINE.
APPLICATION FILED DEC. 10, 1915.

1,203,347.

Patented Oct. 31, 1916.
3 SHEETS—SHEET 1.

Inventor:
Louis J. Hunt,
by Albert G. Davis
His Attorney

L. J. HUNT.
DYNAMO ELECTRIC MACHINE.
APPLICATION FILED DEC. 10, 1915.

1,203,347.

Patented Oct. 31, 1916.
3 SHEETS—SHEET 2.

Inventor:
Louis J. Hunt,
by Albert S. Davis
His Attorney.

L. J. HUNT.
DYNAMO ELECTRIC MACHINE.
APPLICATION FILED DEC. 10, 1915.

1,203,347.

Patented Oct. 31, 1916.
3 SHEETS—SHEET 3.

Inventor:
Louis J. Hunt,
by
His Attorney.

UNITED STATES PATENT OFFICE.

LOUIS J. HUNT, OF SANDYCROFT, WALES, ASSIGNOR TO GENERAL ELECTRIC COMPANY, A CORPORATION OF NEW YORK.

DYNAMO-ELECTRIC MACHINE.

1,203,347.  Specification of Letters Patent.  Patented Oct. 31, 1916.

Application filed December 10, 1915. Serial No. 66,055.

*To all whom it may concern:*

Be it known that I, LOUIS J. HUNT, a subject of the King of Great Britain, residing at Sandycroft, in the county of Flint, in the Principality of Wales, have invented certain new and useful Improvements in Dynamo-Electric Machines, of which the following is a specification.

This invention relates to dynamo-electric machines of the type adapted normally to run as synchronous motors at a cascade speed, while they can be started as induction motors having a normal speed corresponding with one of the basal pole numbers, which speed will be higher than the cascade speed. Hence, such machines can be started and run up about to the speed for synchronous working against a load, and when the cascade speed is reached, the connections can be changed to those for synchronous working.

Stator or primary windings, such as those shown in my United States Patent Reissue No. 13,354, dated Jan. 9, 1912, can be adapted to receive direct-current excitation at pairs of corresponding points in one or two of the phases, which are arranged to be short-circuited in that patent, while corresponding points in the remaining phase are adapted to be short-circuited for damping purposes. Such an arrangement is shown in the British Patent No. 9261 of 1913. In the improved form of winding according to the present invention the direct-current for synchronous excitation is also caused to flow through the main field winding, but its path therein is quite different. The winding according to this invention has the characteristic that it provides two or more parallel paths for each phase in the main or alternating current circuits, thus giving a pair or more than one pair of independent star-connected neutral points, and the direct-current for excitation purposes is led in through these neutral or mid points. The winding is also so arranged as to provide circuits in which local circulating currents can flow, these currents being useful in bringing the machine into synchronism and afterward maintaining the working at synchronous cascade speed.

It will be convenient to assume throughout the description of this invention that the current is supplied to the stationary part of the machine, while the rotor may have a cascade winding of the general type described in my United States Patent Reissue No. 13,591, dated July 8th, 1913, for instance as shown in Figure 14. This cascade winding preferably has additional windings with symmetrical portions thereof connected at one end to symmetrical intermediate points in the windings adapted to give two basal numbers of poles for cascade working and connected at the other end to slip rings which are connected together through resistances so that the machine will start as an induction motor when alternating current is supplied to a portion of the stator winding and will run up to normal speed as the resistances are cut out. The field circuits might of course be on the rotating part while the cascade winding is on the stationary part, and this alternative will need no further reference here. Throughout this description the field winding will be assumed to be upon the stator.

The invention will now be described in connection with the accompanying drawings, which show various examples illustrating types of windings having the characteristic above referred to.

Figure 2:
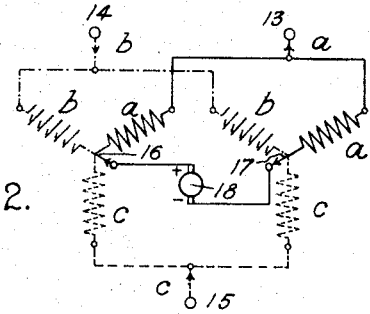
Figure 6:
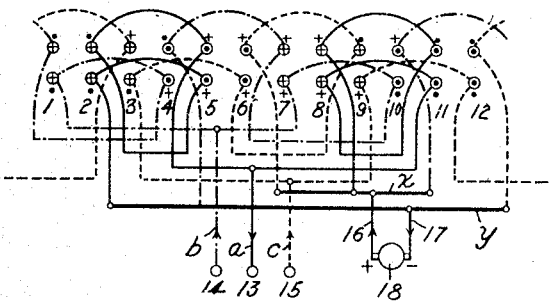
Figure 7:
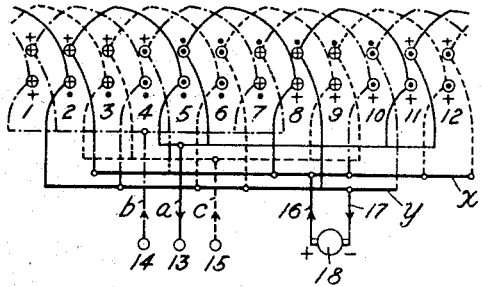
Figure 8:
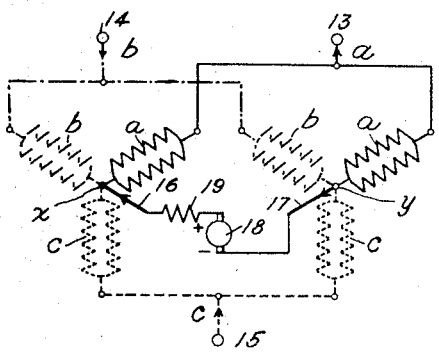
Figure 9:
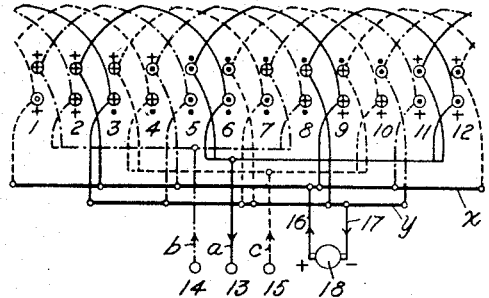
Figure 10:
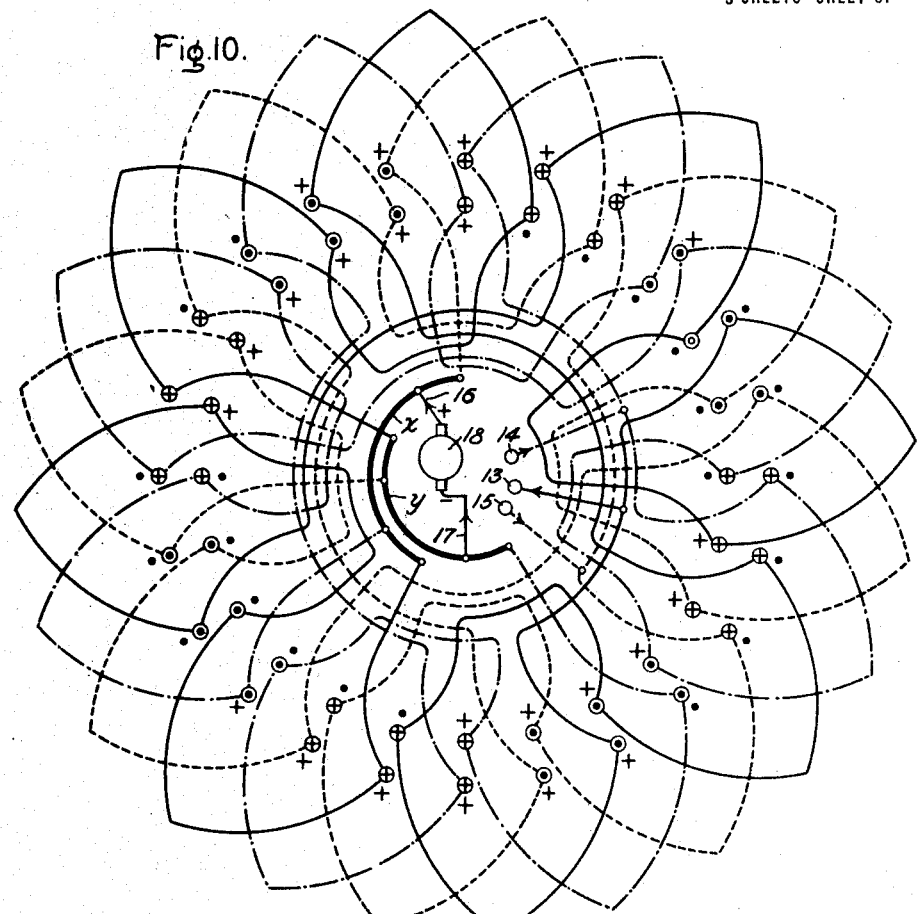
Figure 11:
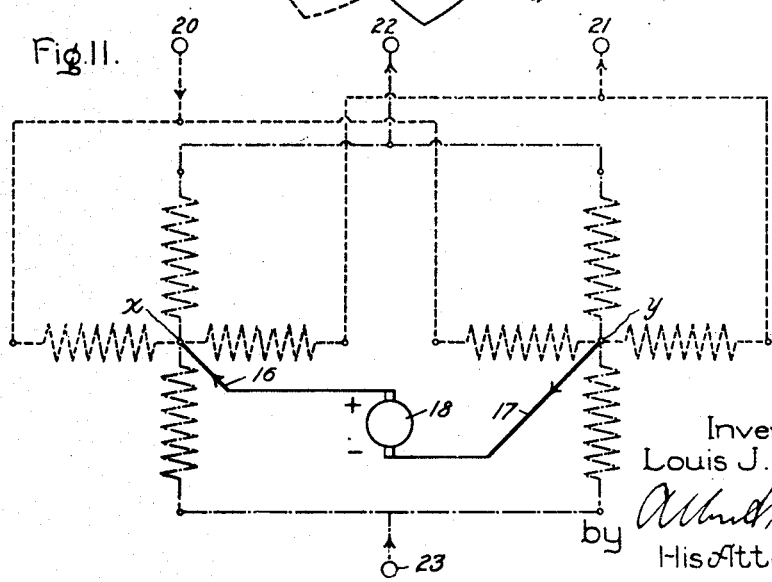

In the drawings, Fig. 1 is a developed diagram of a stator or primary winding; Fig. 2 is a key diagram explaining the flow of currents in the winding of Fig. 1; Figs. 3 to 6 are developed diagrams of modified forms of windings similar to Fig. 1; Fig. 7 is a developed diagram of another type of winding; Fig. 8 is a key diagram explaining Fig. 7; Fig. 9 is a developed diagram showing a further modification of Fig. 7; Fig. 10 shows a circular diagram of a winding having basal pole numbers 4 and 8, and representing the winding of Fig. 1 duplicated, with the parts thereof connected in series; and Fig. 11 is a key diagram illustrating the application of the invention to a machine having two-phase windings, in place of the three-phase windings illustrated in the other figures of the drawings.

In all of the Figs. 1 to 9 the windings shown are the basic or simplest possible windings for carrying the invention into effect, each winding being arranged to give a four-pole field for starting purposes, when the machine is run as an induction motor, and to operate as a cascade-connected synchronous machine with the equivalent of six poles when the direct-current excitation is also applied. In practice such a number of poles is not satisfactory owing to the resulting unbalanced magnetic field, but the necessary change in the windings when the basal pole numbers are increased, for instance to four and eight poles, or to any other number giving a balanced magnetic field, is a simple matter and will be referred to hereinafter. The invention, however, will be more clearly understood from the simple windings illustrated in Figs. 1 to 9.

In all the Figs. 1 to 10 the same convention is adopted as to the different types of lines indicating different instantaneous phases in the windings, as has been adopted for instance in my United States Patent Reissue No. 13,591, dated July 8, 1913; that is to say, the current in phase $a$ shown by full lines is assumed to be at its maximum value, while currents in phases $b$ and $c$ shown respectively by chain-dotted lines and by plain dotted lines are at half the maximum value at the same instant. In Fig. 1 and other similar figures, a thick black line indicates a star-connection.

Referring first to Figs. 1 and 2, it will be seen that the primary or stator winding there shown is a four- and two-pole winding, divided into two sets of coils corresponding with the number of secondary poles (two poles in this case), each set being united in star-connections at their mid-points, marked $x$ and $y$ respectively in Fig. 1, the two sets being connected in parallel. The three-phase currents are led through terminals 13, 14 and 15, into the three phases marked respectively $a$, $b$ and $c$. The conductors are branched and led to bars in slots 180° apart around the circumference of the field. For example, in phase $a$ the current is led into the top bars in slots No. 5 and No. 11 respectively. In phase $b$ the current is led into the top bars in slots No. 1 and No. 7 respectively. In phase $c$ the current is led into the top bars in slots No. 3 and No. 9 respectively. The flow of the currents can be followed from the diagram, and it will be seen that the crosses within the circles representing the bars indicate currents flowing downwardly, while the dots within the circles indicate currents flowing upwardly. It is seen that the flow of currents gives a uniformly distributed four-pole field.

Following out the windings, it will be seen that they lead to the star-connections, or mid-points, $x$ and $y$ respectively. These are connected through tappings 16 and 17 with a direct-current generator 18, which may be direct-coupled to the rotor of the machine, or may be any other suitable source of direct-current. No switch is shown in the direct-current circuit, but of course a suitable switch and if required a regulating resistance may also be provided. Following the flow of current from the direct-current source 18, it will be seen that the current enters the windings at the neutral connection $x$ and flows in parallel paths through each of the three phases which are united in star by said neutral connection, the return flow being through the other portion of the windings to the other star-connection $y$ and the conductor 17 back to the direct-current source 18. The crosses and dots outside the circles representing the bars, indicate the directions of flow of the direct-current, assuming that the direct-current only is flowing in the windings. Where there is a cross outside and a dot inside a circle representing a bar, the actual current in said bar will be in one direction only corresponding with the resultant of the alternating and direct-currents, as will be obvious without further explanation. The directions of flow of the resultant currents are not indicated as this is not considered necessary.

It will be seen that the direct-current field is a two-pole field, but the current is flowing in opposite directions in the upper and lower bars respectively in slots 2, 3 and 4 and slots 8, 9 and 10, so that only half the coils are useful for excitation purposes. This follows from the fact that the pitch of the windings is only one-half that of the secondary pole pitch, the secondary field being a two-pole field here, while the pitch of the windings is three slot spaces as shown. When the machine is running at a speed other than the cascade synchronous speed, local circulating currents are induced in the winding by the rotating field induced in the rotor. The paths for these local circulating currents may be divided into two groups. The first group of three parallel paths includes the direct-current source 18 when it is connected in circuit, the windings of the respective three phases and their end-connections. The other group of paths consists of the closed circuits through one phase, a neutral point, another phase and the other neutral point, not including therefore the source of direct-current. This latter group of three paths therefore is always closed. The local circulating currents in both groups will be found to flow in opposite directions in the bars of one-half of the slots just as the excitation currents have been found to flow, so that only one-half of the copper in the winding is available in practice for the local circulating or damping currents. The local currents whose circuits include the source of excitation are symmetrically distributed, but those which include the phase windings only are unsymmetrically distributed, and therefore not entirely satisfactory. Experiments made with a winding of this type on a small machine have not shown, however, that there is any tendency of the machine to hunt, as might have been supposed from the unsymmetrical distribution of the local circulating or damping currents.

Looking carefully at Fig. 1 it will be seen that the currents in the windings of each of the phases $a$ and $b$ flow in first at a top bar, then return by a bottom bar in a slot three spaces away toward the right, flow back in the bottom bar in the first-mentioned slot, and return through the top bar in a slot three spaces away toward the left. In the case of phase $c$, however, the current flows in at a top bar in one slot, back by the bottom bar in a slot three spaces away toward the right, in again in a bottom bar three spaces farther toward the right, and back in the upper bar of the middle slot. The arrangement of one phase therefore is different from that of the other two phases.

Figure 3:
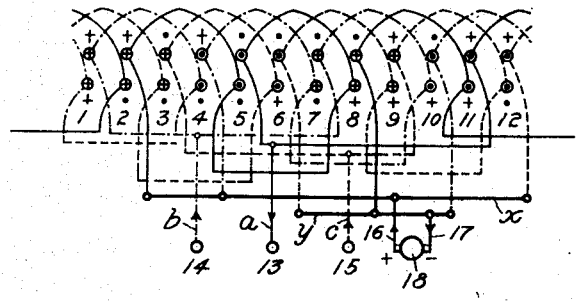

Fig. 3 shows a winding identical with Fig. 1, except that the winding of phase $c$ is arranged in exactly the same manner as that of phases $a$ and $b$, instead of being reversed relative to the said phases. This makes no difference to the flow of currents in the three-phase circuits, but as far as the direct-current excitation is concerned, it has the effect that the currents in the two bars in alternate slots cancel one another, as shown by the crosses and dots outside the bars. The pitch of the coils is the same as before, and only 50% of the copper is effective for direct-current excitation purposes. The distribution of the active slots is uniform, but the effective magneto-motive force is considerably reduced. The induced local circulating currents which flow through the direct-current source 18 also neutralize the effects of one another in alternate groups of coils, and the currents in the active slots can distribute themselves symmetrically. Such a winding would probably not be economical in practice, as it would require a larger excitation current owing to the breadth of the windings, the excitation windings being distributed over the whole circumference of the machine.

Figure 4:
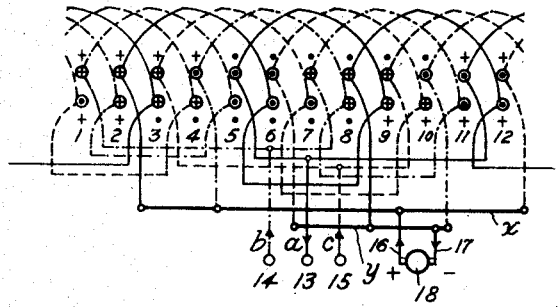

By increasing the pitch of the coils, the percentage of copper effective for excitation purposes can be increased. For example, if there be 36 slots in an actual machine, or 3 slots per pole per phase, for the normal four-pole pitch a coil would be placed in slots 1 and 10 spanning 9 slot spaces. and as the normal pitch for a two-pole winding is a span of 18 slots, or from slot 1 to slot 19, only half the copper can be useful for direct-current excitation purposes in such a case. In other words, the number of active slots per pole can be assumed to be equal to the number of slots spanned by each coil for direct-current excitation purposes. If now the pitch be increased by one slot, so that a coil goes from slot 1 to slot 11 spanning 10 slot spaces, then the percentage of active copper is ten-eighteenths of the total copper, and so forth. At the same time, however, the alternating current circuits are relatively displaced to a corresponding extent, so that less than the whole of the bars are effective for the alternating current excitation. Fig. 4 shows by way of example a winding with the pitch increased by $33\frac{1}{3}\%$, which means that in a machine having 36 slots a coil would occupy slots 1 and 13 spanning 12 slot spaces, and two-thirds of the copper would be available for direct-current excitation purposes. As the pitch of such a winding embraces a number of slots divisible by three (the number of slots per pole per phase), each group of three slots can be represented by a single one, and this is practically what has been done in Fig. 4. The cross-connections of the windings are similar to those of Fig. 1. In Fig. 4 it is seen that the direct-currents in the bars of slots 3 and 4, and 9 and 10 neutralize one another, but in the remaining slots (i. e. eight out of twelve) the direct-current is in the same direction in both bars. The effectiveness of the windings for the alternating currents, however, has been reduced as in each slot the upper and lower bars are in phases 60 electrical degrees apart.

Figure 5:
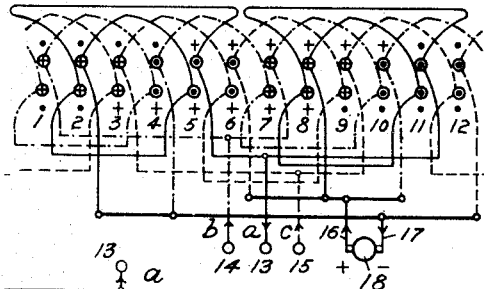

Fig. 5 shows a winding similar to Fig. 1 but with a change in the arrangement of half of the windings of phase $a$, so that each branch of this phase occupies the upper and lower bars of two slots only. With the windings arranged in this way it will be seen from the crosses and dots outside the bars that two-thirds of the copper is available for direct-current excitation, although the pitch of the coils is only 50% of that of the secondary field. The chief disadvantage of this type of winding appears to lie in the unbalancing which occurs due to the difference in shape and length of the windings of phase $a$, while also the circuits for the induced local circulating currents are irregular. The first of these objections can be overcome by arranging the coils in a different way, as indicated in Fig. 6. In this figure the coils are shown disposed in upper and lower ranges, the connections being identical with those of Fig. 5, and the resultant effect is the same, viz., that the currents in the bars of slots 3 and 4, and 9 and 10 respectively, cancel one another as far as the direct-current excitation is concerned. Two-thirds of the stator copper is available for direct-current excitation.

Fig. 7 shows a winding similar to Fig. 1, but with the coils arranged so as to provide two parallel paths in each phase between the supply terminals and each neutral point. The key diagram, Fig. 8, will make this clear by comparison with Fig. 2. It will be seen from the crosses and dots both inside and outside the circles representing the bars, that the flow of the alternating currents and the direct excitation currents is the same in Fig. 7 as in Fig. 1; but the flow of the local circulating currents is quite different in this case. The voltages induced by the secondary rotor field in each pair of stator coils in one phase are in quadrature, and currents produced by the resultant of these voltages can therefore circulate in each of the closed circuits of each phase. These local currents can distribute themselves sinusoidally, the currents in alternate slots canceling one another. They will therefore be very effective in pulling the machine into synchronism and maintaining synchronism. The induced local circulating currents which flow through the direct-current connections, the neutral points and the respective phases, can also distribute themselves sinusoidally, but they do not cancel one another in any of the slots, so that their damping effect is even better than that produced by the currents circulating in the local circuits of each phase. There are also local circuits between one phase and another, and the currents in these circuits are as effective as before; but although the currents in each of these sets of circuits would individually effect adequate damping to maintain synchronism, the currents when superimposed give results which are not satisfactory. The result is that the currents may swing from one circuit to the other or may otherwise vary, and hunting may result. This is only noticeable when the flux density in the iron is high so that harmonics can arise. In order to prevent this hunting, the circulation of currents in one of the circuits may be largely reduced or stopped, and this might be effected for instance by connecting a reactance (or even a resistance) as at 19, in the direct-current excitation circuit as indicated in Fig. 8. It is to be noted that this method of connecting the windings of each section of each phase so as to form two parallel paths, is applicable to the other types of windings, and not only to that of Fig. 1. It may be applied for instance to the windings of Fig. 6.

Fig. 9 shows a winding having the coils connected to give two parallel paths in each section of each phase, as in Figs. 7 and 8, but the pitch of the coils is increased by 33⅓% so that two-thirds of the copper is effective for excitation purposes. In this case the local circulating currents through the neutral points and the direct-current circuit are sinusoidally distributed, but those flowing through the local circuits of the respective phases are very unevenly distributed. Probably then with such a winding there would be no risk of hunting, and it would be quite unnecessary to use a reactance or resistance as at 19 in Fig. 8. Moreover, this winding has the advantage that the neutrals $x$ and $y$ may be short-circuited if required, so that the machine would run as an induction motor, in the event for instance of a failure of the direct-current excitation. This can be done also whenever it is required to attend to the commutator, brush gear and so forth, as the exciter machine can be completely isolated when the neutrals are short-circuited.

Fig. 10 shows the complete diagram of a stator winding for 4 and 8 poles, with windings of the type shown in Fig. 1. The windings of Fig. 1 are here duplicated and connected in series as will be apparent if the connections shown are followed out. The windings may also be connected in some cases in parallel instead of in series, but it is not considered necessary to illustrate this. The necessary change will be apparent by reference to Fig. 16 of my above-mentioned Patent Reissue No. 13,591 which shows a parallel connected four and eight-pole rotor winding, while Fig. 15 of the same patent shows a series connected rotor winding.

Many of the windings could be modified to adapt them for use with two-phase currents instead of three-phase currents. Fig. 11 for example shows a diagram corresponding with Fig. 2 but adapted for two-phase currents. The two phases are here indicated by plain dotted and chain-dotted lines to distinguish them, the terminals of one phase being numbered 20 and 21, while those of the other phase are numbered 22 and 23. It would also be possible to provide two parallel paths in each branch of each phase, as in Fig. 8.

Although in the windings hereinbefore described the division has always been into two groups giving two neutral points, yet it will be apparent that by a process of duplication a larger number, say four neutral points, could be obtained for instance in a winding of the four- and eight-pole type, and if desired for any reason the direct-currents might be supplied from separate sources or from separate windings of the one generator to the separate pairs of neutral points. This will not usually be necessary however.

What I claim as new and desire to secure by Letters Patent of the United States is,—

1. In an alternating current motor designed to run as a synchronous motor at cascade speed, a primary winding comprising a plurality of sets of star-connected coils, said sets being connected in parallel, means for supplying alternating current to the terminals of said sets, and a source of direct-current connected between the mid-points of said sets.

2. In an alternating current motor designed to run as a synchronous motor at cascade speed, a primary winding comprising a plurality of sets of star-connected coils, said sets being connected in parallel, means for supplying alternating current to the terminals of said sets to produce an alternating current field of one number of poles, and a source of direct-current connected between the mid-points of said sets to produce a direct-current field of a different number of poles.

3. In an alternating current motor designed to run as a synchronous motor at cascade speed, a primary winding comprising two sets of star-connected coils, the coils in each phase of each set being connected in parallel paths between the terminals and the mid-points thereof, said sets being connected in parallel, means for supplying alternating current to the terminals of said sets, and a source of direct current connected between the mid-points of said sets.

4. In an alternating current motor designed to run as a synchronous motor at cascade speed, a primary winding comprising two sets of star-connected coils, the coils in each phase of each set being connected in parallel paths between the terminals and the mid-points thereof, said sets being connected in parallel, means for supplying alternating current to the terminals of said sets to produce an alternating current field of one number of poles, and a source of direct current connected between the mid-points of said sets to produce a direct-current field of a different number of poles.

5. In an alternating current motor designed to run as a synchronous motor at cascade speed, a primary winding comprising a plurality of sets of star-connected coils, said sets being connected in parallel, means for supplying alternating current to the terminals of said sets to produce an alternating current field of one number of poles, and a source of direct current connected between the mid-points of said sets to produce a direct-current field of a different number of poles, the coils of said primary winding having a pitch greater than the full pitch for the greater number of poles.

In witness whereof, I have hereunto set my hand this twenty fourth day of November, 1915.

LOUIS J. HUNT.

Copies of this patent may be obtained for five cents each, by addressing the "Commissioner of Patents, Washington, D. C."